UNITED STATES PATENT OFFICE.

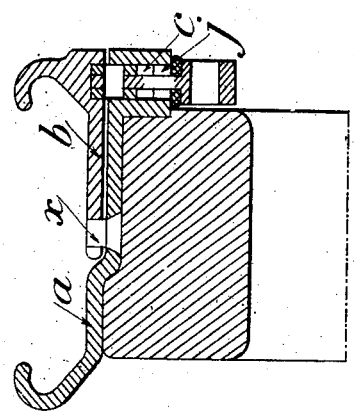
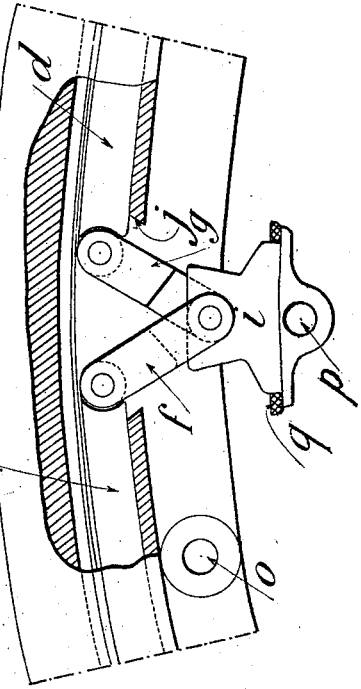
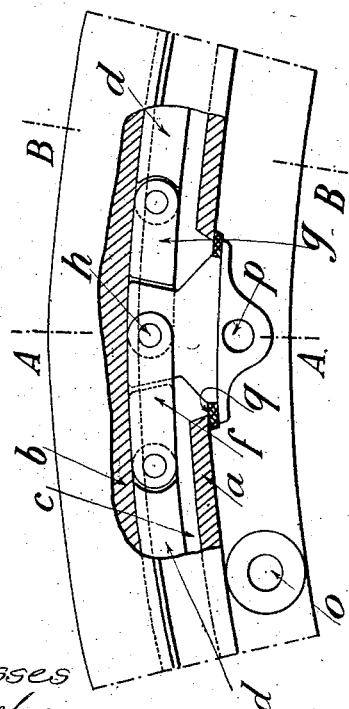

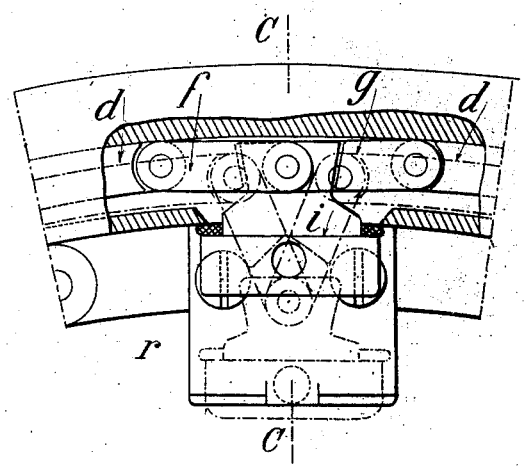
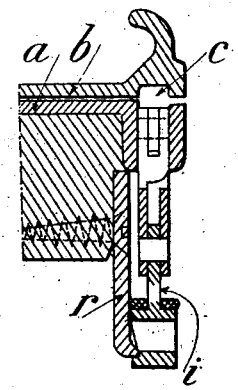
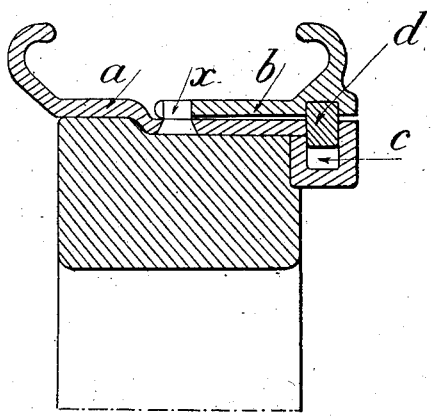
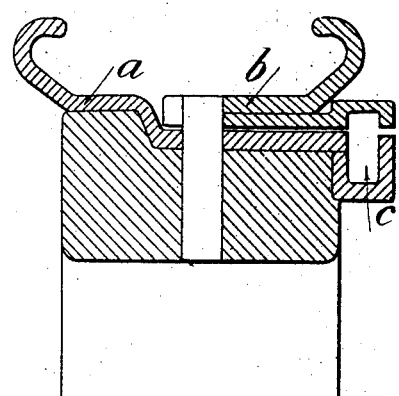

HENRI PATAUD, OF PARIS, FRANCE.

WHEEL-RIM.

No. 797,781.  Specification of Letters Patent.  Patented Aug. 22, 1905.

Application filed January 14, 1905. Serial No. 241,132.

*To all whom it may concern:*

Be it known that I, HENRI PATAUD, civil engineer, a citizen of France, residing at 15 Rue de la Federation, Paris, in the French Republic, have invented new and useful Improvements in Wheel Rims or Fellies, of which the following is a specification.

This invention relates to a new or improved dismountable felly or rim for a vehicle-wheel, said felly comprising two continuous circular rigid members adapted to fit one against or above the other and forming by the superposition of their respective grooves an annular closed housing in which is inserted a continuous spring-ring, the ends of which are attached to two connecting-links pivoted to a common exteriorly-projecting tightening or loosening device, so that said ends can instantaneously be brought toward or moved away from each other when said tightening or loosening device is manipulated from the exterior, thus causing the spring-ring in the housing to assume either its smaller diameter, in which dismounting of the rim may be easily effected, or its larger diameter, in which the two members of the rim are strongly connected together.

In the accompanying drawings, Figures 1 to 5 represent one form of construction, in which the spring situated within the housing in the felly tends to close itself by reason of its elasticity. Fig. 1 is a sectional elevation of a portion of the felly in its active or operative position. Fig. 2 is a partial longitudinal section of the spring-ring, showing the pivotal connection thereof. Figs. 3 is a cross-section of the felly on the line A A of Fig. 1. Fig. 4 is a sectional elevation similar to Fig. 1, but showing the spring in its inoperative or dismounted position. Fig. 5 is a section on the line B B of Fig. 1. Figs. 6 and 7 represent a second form of construction, in which the spring situated in the housing of the felly tends to force itself open. Fig. 6 is a sectional side elevation showing the spring and its connecting links in full lines in the operative position and in broken lines in the dismounted position. Fig. 7 is a cross-section on the line C C of Fig. 6, the movable device being shown in the dismounted position. Fig. 8 represents a slight modification of the form of the felly or rim.

Referring to Figs. 1 to 5, it will be seen that the felly comprises two rigid metal members $a$ and $b$, fitted one above the other. Each member is shaped to form on one side an annular or circumferential groove, so that when they are fitted together a closed housing is produced into which is inserted a non-continuous ring or steel spring $d$, the ends of which are provided with two connecting-links $f$ and $g$, pivoted on a common pin or axle $h$, upon which is also pivoted a pulling or pushing member or button $i$, which projects outwardly through an aperture $j$ in the bottom of the housing $c$. In the position of rest the spring, which tends to coil or close itself, is in the position shown in Fig. 4—that is to say, is completely lodged in the groove of the member $a$, so that in this position the second member $b$ can be easily removed or fitted by sliding it on the member $a$. When said two members are to be strongly connected for use of the wheel, at key or lever is used having two cylindrical tenons at a certain distance from each other. One of the tenons is inserted into a hole $o$ in a fixed part of the felly and the second tenon into a hole $p$ in the button $i$. The key is then manipulated so that it pivots round the center $o$ and pushes the member $i$ toward the interior of the housing $c$, thus extending the links $f$ and $g$ and expanding the spring. If this movement is continued so as to completely straighten out the links $f$ and $g$, the spring bears against the upper wall of the housing $c$ and holds the connecting-links rigidly in the position shown in Fig. 1. The spring-ring now completely fills the groove in the member $b$ and partially engages the groove in the other member $a$ in such a manner that said two members are strongly connected together. Should one of the pivot-pins of the connecting-links break, the shape of the parts would prevent the spring from closing, for in tending to so close the spring would wedge the shoulders of the links against the sides of the button $i$ and the whole would remain in place. When it is desired to dismount the felly for tire or other repairs, it is only necessary to operate the key in a reverse manner to that referred to above, so as to bring the spring and its connecting-links back into the position shown in Fig. 4, and as soon as the links are moved beyond the dead-point of the position in which they are in a straight line the movement continues automatically under the action of the spring. The head of the button $i$ is preferably provided with a washer or small disk of leather or india-rubber $q$, which will completely close the aperture $j$ in the housing $c$ during use for preventing dust or mud from penetrating to said housing.

In the second form of construction (shown in Figs. 6 and 7) the spring tends to expand, and its position of rest will correspond to the position which it occupies when the wheel is ready for use—that is to say, to that in which the two members of the felly are connected together—as shown in full lines in Fig. 6. When the felly is to be taken apart, it is necessary to draw the member $i$ inward by means of a key, as before, and to guide it into the position shown in Fig. 7, where it will be held by the hooked end of a plate $r$, fixed to the wheel, during the taking apart and putting together again of the felly or rim. After the reassembling the hooked end of the plate $r$ is disengaged from the button $i$, the spring on relaxing then causing the connecting-links to rise again and lie flat against the interior of the upper groove, thus connecting the two parts of the felly together again. With this form of construction if one of the pivot-pins of the connecting-links should break the spring tends to forcibly connect the two members of the felly, so that no accidents need be feared.

For preventing circumferential displacement of the member $b$ with regard to member $a$ pins $x$ with countersunk heads may be fixed in the said member $a$, adapted to engage corresponding recesses in the inner edge of the member $b$. (See Figs. 3 and 5.)

The tire may be fixed and held on the rim or felly by any known means.

Fig. 8 shows a form of felly somewhat different from that shown in the other figures, the part $b$ being formed by a cast-iron sheet suitably bent to form its part of the housing.

The member $b$ may extend across the whole width of the member $a$ or across only part of said width, according to requirements.

The improved dismountable felly described can obviously be used with wooden or metal wheels.

The connecting-links and pull or push button might also be replaced by a cam or eccentric or any other means by which the ends of the spring may be brought nearer to or forced away from each other, and the spring-ring may have a constant section throughout or a varying section, so as to facilitate its perfect circumferential adaptation to the interior wall of the housing.

Having now described my invention, what I claim as new, and desire to secure by Letters Patent, is—

1. A dismountable wheel rim or felly comprising in combination two circular rigid continuous members $a$ and $b$ fitted one upon the other, an annular groove formed respectively on each member so that by the fitting of both members an annular housing $c$ is provided, a non-continuous spring-ring $d$ inserted in the annular housing $c$, and means for drawing together or moving apart the ends of said spring-ring, substantially as and for the purpose set forth.

2. A dismountable wheel rim or felly comprising in combination two circular rigid continuous members $a$ and $b$ fitted one upon the other, an annular groove formed respectively on each member so that by the fitting of both members an annular housing $c$ is provided, a non-continuous spring-ring $d$ inserted in the annular housing $c$ and tending to coil or close itself, a pulling or pushing member $i$, connecting-links $f$ and $g$ having one end pivoted respectively to each of the free ends of the spring-ring $d$ and the other end pivoted together and to the member $i$, and holes $p$ and $o$ provided respectively in the member $i$ and in a fixed part of the felly in order to receive the tenons of a manipulating-key, substantially as and for the purpose set forth.

3. A dismountable wheel rim or felly comprising in combination two circular rigid continuous members $a$ and $b$ fitted one upon the other, an annular groove formed respectively on each member so that by the fitting of both members an annular housing $c$ is provided, a non-continuous spring-ring $d$ inserted in the annular housing $c$ and tending to open itself, a pulling or pushing member $i$ provided with a recess, connecting-links $f$ and $g$ having one end pivoted respectively to each of the free ends of the spring $d$ and the other end pivoted together and to the member $i$, a plate $r$ fixed to the wheel and provided with a hook adapted to engage the recess of the member $i$ in the unmounted position, and holes $p$ and $o$ provided respectively in the member $i$ and in a fixed part of the felly in order to receive the tenons of a manipulating-key, substantially as and for the purpose set forth.

In testimony whereof I have signed my name to this specification in the presence of two subscribing witnesses.

HENRI PATAUD.

Witnesses:
 ANTOINE LAVOIS,
 ARCHIBALD R. BAKER.